(12) United States Patent
Gries et al.

(10) Patent No.: US 10,782,056 B2
(45) Date of Patent: Sep. 22, 2020

(54) METHOD FOR OPERATING A VARIABLE-SPEED REFRIGERANT COMPRESSOR

(71) Applicant: SECOP GMBH, Flensburg (DE)

(72) Inventors: Ulrich Gries, Hamburg (DE); Juergen Ewald Glaeser, Handewitt (DE); Allan Haue Slot, Sonderborg (DK); Hans-Erik Fogh, Flensburg (DE)

(73) Assignee: SECOP GMBH, Flensburg (DE)

(*) Notice: Subject to any disclaimer, the term of this patent is extended or adjusted under 35 U.S.C. 154(b) by 44 days.

(21) Appl. No.: 16/320,837

(22) PCT Filed: Dec. 1, 2017

(86) PCT No.: PCT/EP2017/081204
§ 371 (c)(1),
(2) Date: Jan. 25, 2019

(87) PCT Pub. No.: WO2018/100165
PCT Pub. Date: Jun. 7, 2018

(65) Prior Publication Data
US 2019/0162459 A1 May 30, 2019

(30) Foreign Application Priority Data
Dec. 1, 2016 (AT) .......................... GM 50254/2016

(51) Int. Cl.
*F25B 49/02* (2006.01)

(52) U.S. Cl.
CPC .... *F25B 49/022* (2013.01); *F25B 2600/0251* (2013.01); *F25B 2600/0253* (2013.01);
(Continued)

(58) Field of Classification Search
CPC ............ F25B 49/022; F25B 2600/0251; F25B 2600/0253; F25B 2700/2104;
(Continued)

(56) References Cited

U.S. PATENT DOCUMENTS

| 5,615,829 A | * | 4/1997 | Porter | .................... G05D 23/32 236/68 B |
| 6,134,901 A | | 10/2000 | Harvest et al. | |

(Continued)

FOREIGN PATENT DOCUMENTS

| DE | 197 53 425 | 8/1999 |
| DE | 10 2011 079205 | 1/2013 |

(Continued)

OTHER PUBLICATIONS

Int'l Search Report (Form PCT/ISA/210) conducted Int'l Appln. No. PCT/US2017/081204 (dated Jan. 26, 2018).

*Primary Examiner* — Marc E Norman
(74) *Attorney, Agent, or Firm* — Greenblum & Bernstein, P.L.C.

(57) ABSTRACT

The invention relates to a method for operating a variable-speed refrigerant compressor (2) for cooling a cooling volume (4) of a refrigeration system (1) that does not have its own control unit, wherein the refrigeration system (1) comprises at least one thermostat (3) for directly or indirectly monitoring a temperature state of the cooling volume (4) and wherein the rotational speed behavior of the refrigerant compressor (2) during a cooling cycle is controlled by means of a preset closed-loop rotational speed control saved in an electronic control device (6) of the refrigerant compressor (2), based on at least one predefined parameter, in that the at least one predefined parameter is monitored with respect to an over- and/or undershooting by a current parameter of a current cooling cycle, and relates to an electronic control device (6) for controlling the cyclical operation of a (Continued)

variable-speed refrigerant compressor. In order to enable an adaptation of the preset closed-loop rotational speed control performed by the electronic control device (6) of the refrigerant compressor (2) to the refrigeration system and/or ambient conditions, it is provided according to the invention that an additional temperature independent from the temperature of the cooling volume (4) is measured and the at least one predefined parameter is changed as a function of the additional temperature.

9 Claims, 4 Drawing Sheets

(52) U.S. Cl.
CPC .......... *F25B 2700/2104* (2013.01); *F25B 2700/2106* (2013.01)

(58) Field of Classification Search
CPC ...... F25B 2700/2106; F25B 2700/2115; F25B 2700/21153; F25B 2700/21155; F25B 2700/21156

See application file for complete search history.

(56) References Cited

U.S. PATENT DOCUMENTS

| | | | |
|---|---|---|---|
| 6,409,090 | B1* | 6/2002 | Gilvar .............. G05D 23/1923 122/448.1 |
| 2006/0156749 | A1 | 7/2006 | Lee et al. |
| 2007/0130975 | A1* | 6/2007 | Tsuboi .............. B60H 1/3204 62/228.5 |

FOREIGN PATENT DOCUMENTS

| | | |
|---|---|---|
| DE | 10 2013 114374 | 7/2014 |
| EP | 0 931 236 | 7/1999 |
| EP | 1 684 025 | 7/2006 |
| WO | 98/15790 | 4/1998 |
| WO | 2015/189009 | 12/2015 |

\* cited by examiner

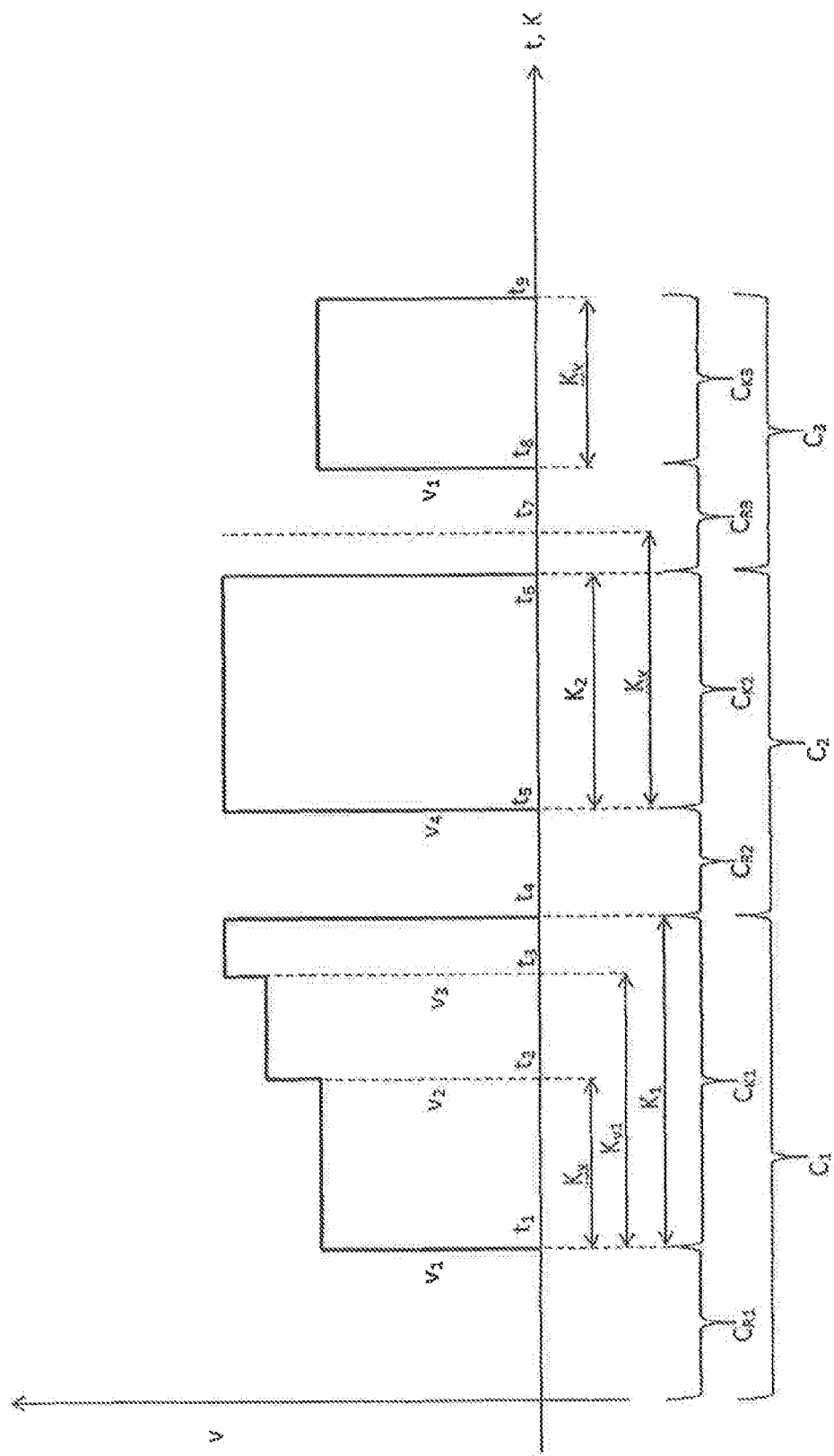

METHOD FOR OPERATING A VARIABLE-SPEED REFRIGERANT COMPRESSOR

FIELD OF THE INVENTION

The invention relates to a method for operating a variable-speed refrigerant compressor for cooling a cooling volume of a refrigeration system, wherein the refrigeration system comprises at least one thermostat for directly or indirectly monitoring a temperature state of the cooling volume, and wherein the refrigerant compressor is operated cyclically and a cooling cycle of the refrigerant compressor begins when the refrigerant compressor is placed in an ON state by a switching signal triggered by the thermostat and the cooling cycle ends when the refrigerant compressor is placed in an OFF state by an additional switching signal triggered by the thermostat, and the rotational speed behavior of the refrigerant compressor during a cooling cycle is controlled by means of a preset closed-loop rotational speed control saved in an electronic control device of the refrigerant compressor, based on at least one predefined parameter, in that the at least one predefined parameter is monitored with respect to an over- and/or undershooting by a current parameter of a current cooling cycle, and relates to an electronic control device for controlling the cyclical operation of a variable-speed refrigerant compressor. Often, the electronic control device of the refrigerant compressor is also referred to as the control system of the refrigerant compressor.

Variable-speed refrigerant compressors can be used in connection with a plurality of different refrigeration systems, such as refrigeration units, that is, for example, refrigerators or refrigerated display cases, freezers, air conditioning systems, or heat pumps. Compared to fixed-speed refrigerant compressors, they offer the advantage of being able to work in a more energy-optimized manner and of being able to adapt the delivered cooling capacity to the cooling requirement relating to the cooling volume.

Optimally, variable-speed refrigerant compressors are used in refrigeration systems which have their own electronic control unit and components for monitoring the operating state of the refrigeration systems. Refrigeration systems of this type are hereinafter referred to as intelligent refrigeration systems. Different switching signals, parameters and measured values are thereby processed in the electronic control unit of the refrigeration system, which is different from the electronic control device of the refrigerant compressor, and, from these input values, a control signal is generated which is transmitted to the electronic control device of the refrigerant compressor. This control signal can, for example, be a preset rotational speed that specifies to the electronic control device of the refrigerant compressor, as a function of the current temperature or the temperature progression of the cooling volume, the rotational speed at which the refrigerant compressor is to be operated and/or whether the electronic control device of the refrigerant compressor is to switch the refrigerant compressor on or off.

In intelligent refrigeration systems, operation, in particular the rotational speed behavior of a variable-speed refrigerant compressor, is therefore controlled by the interaction of the electronic control unit of the refrigeration system with the electronic control device of the refrigerant compressor, wherein the electronic control unit of the refrigeration system normally already transmits specifically defined cooling requirements to the electronic control device of the refrigerant compressor.

However, the present invention relates to a different type of refrigeration systems, namely, to those which do not have an electronic control unit that can communicate with the electronic control device of the refrigerant compressor, and which do not comprise any electronic components for monitoring the operating state of the refrigeration system. Refrigeration systems of this type are therefore hereinafter referred to as simple refrigeration systems. They comprise at least one thermostat that monitors the temperature level of the cooling volume and, as a function of the current temperature level, triggers a switching signal that places the refrigerant compressor in the ON state or in the OFF state. Simple refrigeration systems communicate neither a preset rotational speed nor any other data to the electronic control device of the refrigerant compressor. They are also not capable of acquiring other operating parameters, such as the coldroom temperature or the progression thereof, for example, and calculating cooling requirements for the refrigerant compressor therefrom.

Cooling capacity is either requested or not requested by means of the thermostat, but without the cooling capacity being quantified, which means that the closed-loop rotational speed control of the refrigerant compressor is carried out solely by the electronic control device of the refrigerant compressor, and thus by the programming thereof.

To nevertheless be able to utilize the fundamental advantage of variable-speed refrigerant compressors over fixed-speed refrigerant compressors, it is necessary that the rotational speed behavior of the refrigerant compressor controlled by the electronic control device of the refrigerant compressor is as optimized as possible with regard to parameters that are to be defined, for example, with regard to energy consumption.

As energy-optimized as possible is thereby to be understood as meaning that the electricity consumption or energy consumption by the refrigerant compressor is especially low during the cooling of the cooling volume required for the individual application case, and that the refrigerant compressor can therefore be operated in a resource-friendly manner.

It can thereby be seen as impeding that the electronic control device of the refrigerant compressor does not receive any information from the refrigeration system about the operating state of the refrigeration system, in particular, no preset rotational speed.

In practice, this disadvantage is compensated by the fact that simple refrigeration systems are distinguished in that they have a lower purchase price than intelligent refrigeration systems, which is why they are still widely used throughout the world.

Prior Art

Both variable-speed and also fixed-speed refrigerant compressors produce a circulation of a refrigerant in a closed refrigerant system. The refrigerant is thereby heated by an absorption of energy from the cooling volume in an evaporator, and is ultimately overheated, and pumped to a higher pressure level by means of the refrigerant compressor in a piston/cylinder unit by a piston which moves translationally in a cylinder housing, at which pressure level the refrigerant emits heat via a condenser and is transported back into the evaporator again via a throttle valve in which a pressure reduction and the cooling of the refrigerant take place. The movement of the piston is achieved by means of a crank drive driven by an electric drive unit, which crank drive comprises a crankshaft.

The refrigerant process described above runs during a cooling cycle of the refrigerant compressor, wherein the refrigerant compressor is driven during the cooling cycle and exhibits a rotational speed behavior controlled by the electronic control device of the refrigerant compressor, wherein the electronic control device actuates the electric drive unit of the refrigerant compressor.

A cooling cycle begins as a result of a switching signal triggered by the thermostat of the refrigeration system, which switching signal places the refrigerant compressor in the ON state. For example, the thermostat triggers a switching signal for the ON state of the refrigerant compressor when the temperature level in the cooling volume or a cooling volume temperature or a temperature representative of the cooling volume temperature exceeds a preset maximum value. For the purpose of monitoring the temperature level of the cooling volume, the thermostat can, for example, be embodied as a vapor pressure-based thermostat, in particular as a bellows thermostat, or can comprise a bimetallic strip or an NTC (negative temperature coefficient) element as a temperature sensor.

The refrigerant compressor is driven, or remains in the cooling cycle in which the refrigerant process is running, until the electronic control device of the refrigerant compressor receives an additional switching signal triggered by the thermostat, which signal places the refrigerant compressor in the OFF state. The additional switching signal can thereby be triggered, for example, if the temperature level or a cooling volume temperature or a temperature representative of the cooling volume temperature has fallen below a preset minimum value as a result of the cooling taking place in the cooling volume during the cooling cycle.

To allow the cooling volume to be cooled in the most energy-optimized manner possible, the electronic control device of the refrigerant compressor works according to a programmed target during the cooling cycle, which target controls the rotational speed behavior of the refrigerant compressor during a cooling cycle. This preset closed-loop rotational speed control renders it possible for variable-speed refrigerant compressors to also be controlled individually, for example, in an energy-optimized manner, within the scope of the programmed target in simple refrigeration systems, which, as mentioned at the outset, themselves do not have an electronic control unit that is capable of communicating with the electronic control device of the refrigerant compressor.

The preset closed-loop rotational speed control is thereby configured such that at least one current parameter that can be acquired by the electronic control of the refrigerant compressor during a cooling cycle is compared with at least one predefined parameter that is saved in the electronic control device, and the rotational speed behavior of the refrigerant compressor is controlled as a function thereof.

The at least one predefined parameter can be a wide range of different parameters, for example, the electric load of the refrigerant compressor, which electric load is determined during the cooling cycle by means of a measurement of the electric current through the refrigerant compressor, in particular by means of the electric current flowing through the electric drive unit of the refrigerant compressor.

Preferably, however, the predefined parameter is the duration of a cooling cycle. This duration thereby represents that value of the parameter at which a most energy-optimized possible, cyclical operation is enabled at a preset rotational speed behavior during a cooling cycle, preferably at a lowest possible rotational speed at which the electric motor driving the refrigerant compressor can be operated with high efficiency.

In other words, with the preset closed-loop rotational speed control, it is to be possible to continuously maintain a temperature level in the cooling volume of the refrigeration system in the most energy-optimized manner possible. In the case of the duration of a cooling cycle as a predefined parameter, for example. When this preset duration is over- or undershot, that is, when the span of time between the response of the thermostat of the simple refrigeration system for the switching-on and switching-off of the refrigerant compressor is greater or less than the predefined parameter, the preset closed-loop rotational speed control causes the electronic control device of the refrigerant compressor to change the rotational speed thereof either immediately or with the next cooling cycle, with the goal that subsequent cooling cycles once again exhibit a duration that corresponds to the predefined parameter (duration), so that the refrigerant compressor can once again be operated in the most energy-optimized manner possible in each cooling cycle.

Such a preset closed-loop rotational speed control for operating a variable-speed refrigerant compressor in a simple refrigeration system is known from DE 102013114374, for example. The control of the rotational speed behavior thereby takes place during the current cooling cycle, wherein the rotational speed of the refrigerant compressor is increased if an overshoot of the at least one predefined parameter (therein the duration of a cooling cycle) by the current parameter has been detected. An increase of this type can also occur multiple times during a cooling cycle if the current parameter overshoots multiple predefined parameters, that is, if for example the thermostat still does not trigger a switching signal for switching off the refrigerant compressor despite an increase in the rotational speed, because the temperature level in the cooling volume is still too high.

The increase can take place in a progressive, degressive, linear, or stepwise manner.

If the electronic control device detects, for example after multiple cooling cycles of the refrigerant compressor, that the increase, even multiple times, in the rotational speed in each cooling cycle still does not result in the ability to maintain the predefined parameter, for example, the predefined duration of a cooling cycle, then it can also be provided according to prior art that the starting rotational speed of one or more subsequent cooling cycles is already set higher than is intended in the most energy-optimized possible case.

Likewise, it can be provided that the starting rotational speed of a subsequent cooling cycle is reduced if the at least one predefined parameter is undershot.

The accuracy with which the rotational speed behavior of the refrigerant compressor is represented as a result of the preset closed-loop rotational speed control depends on the individual programming that is preset by the refrigerant compressor manufacturer upon delivery of the refrigerant compressor. In any case, it is essential that the preset closed-loop rotational speed control that controls the rotational speed during a cooling cycle takes place as a function of a predefined parameter.

The at least one predefined parameter is thereby chosen by the manufacturer of the refrigerant compressor such that previously known operating parameters of the refrigeration system are taken into consideration, such as for example heat or cooling losses in the cooling volume and/or in the refrigerant system and ambient temperatures that can possibly be expected, so that the variable-speed refrigerant compressor runs in the most energy-optimized manner possible during a cooling cycle as the result of the preset closed-loop rotational speed control. In the case of deviations of a current parameter corresponding to the at least one predefined parameter from the at least one predefined parameter during a current cooling cycle, the preset closed-loop rotational speed control serves to control the rotational speed behavior of the refrigerant compressor such that the current parameter once again essentially corresponds to the predefined parameter as quickly as possible, either during the remaining current cooling cycle or at least in a subsequent cooling cycle or within a few subsequent cooling cycles.

Because the predefined parameter and the preset closed-loop rotational speed control are already saved or stored in the electronic control device of the refrigerant compressor by the compressor manufacturer on delivery, the determination of the predefined parameter is a compromise, since the location of use (and therefore ambient conditions, in particular, ambient temperatures) for the refrigerant compressor is normally not known at this point in time. Furthermore, the refrigerant compressor is also intended to enable installation in different refrigeration systems, which may differ from one another with regard to design and therefore also to insulation. Under these circumstances, it is understandable that the predefined parameter and preset closed-loop rotational speed control cannot lead to a most energy-optimized. possible operation in all combinations. The use conditions for the simple refrigeration systems can therefore be considered as so inhomogeneous that the predefined parameter on which the preset closed-loop rotational speed control is based is not capable of operating the refrigerant compressor in the most energy-optimized manner possible in all cases.

It can thus be the case, for example, when a refrigerant compressor of this type is operated in a refrigeration system with high ambient temperatures, that the duration of a cooling cycle predefined for a most energy-optimized possible operation can generally be maintained, and the at least one current parameter therefore quickly corresponds to the predefined parameter again after initial deviations, but that, in order to achieve this, the preset closed-loop rotational speed control must, for example, markedly accelerate the refrigerant compressor with each cooling cycle, or else must start each cooling cycle with a high starting rotational speed.

In such a case, the preset closed-loop rotational speed control renders it possible that the predefined parameter can be maintained, for example, that the predefined duration of a cooling cycle is not overshot by the duration of a current cooling cycle, but the preset closed-loop rotational speed control must as a result constantly run extremely high rotational speeds so that a most energy-optimized possible operation is not possible.

OBJECT OF THE INVENTION

The object of the invention is therefore to overcome the disadvantages of the prior art and to propose a method for operating a variable-speed refrigerant compressor with an electronic control device so that, when a variable-speed refrigerant compressor of this type is operated with a simple refrigeration system that does not have its own electronic control unit that can communicate with the electronic control device of the refrigerant compressor, an adaptation can take place of the preset closed-loop rotational speed control performed by the electronic control device of the refrigerant compressor to the refrigeration system and/or ambient conditions.

DESCRIPTION OF THE INVENTION

This object is attained with a method according the invention of the type described at the outset for a simple refrigeration system in that an additional temperature independent from the temperature of the cooling volume is measured and the at least one predefined parameter is changed as a function of the additional temperature.

The acquisition and transmission of the additional temperature that is independent from the refrigerant compressor temperature level monitored by the thermostat constitutes a piece of information additional to the switching signals of the thermostat for the electronic control device of the refrigerant compressor. The additional temperature can thus be included in the closed-loop control of the rotational speed behavior, that is, in the preset closed-loop rotational speed control, as an additional control variable. Including the additional temperature in the preset closed-loop rotational speed control is thereby to be understood as meaning that the at least one predefined parameter is modified as a function of the additional temperature, whereas the remaining parameters of the preset closed-loop rotational speed control, such as the value by which the rotational speed is increased or reduced when the at least one predefined parameter is over- or undershot, can preferably remain unchanged or else can likewise be adapted. In the simplest case, the condition that must be satisfied in order to trigger a change to the rotational speed behavior, preferably the current rotational speed, of the refrigerant compressor is changed by the change to or modification of the at least one predefined parameter.

The additional temperature can generally—except for within the cooling volume—be measured at any location of the refrigeration system, refrigerant compressor, or electronic control device of the refrigerant compressor. Using the measured additional temperature, it is possible to either directly or indirectly deduce operationally induced influencing variables for the refrigeration system, for example operational waste heat, and/or the ambient conditions, for example ambient temperature, for the refrigeration system.

For example, the additional temperature can be measured outside of the refrigeration system and can directly correspond to the ambient temperature. It is also conceivable that the additional temperature is measured in the interior of an outer housing of the refrigeration system, but not in the interior of the cooling volume, and that the operationally induced influencing variables for the refrigeration system and/or the ambient conditions for the refrigeration system are indirectly deduced using the measured additional temperature and/or the progression of the measured additional temperature.

The at least one predefined parameter of the preset closed-loop rotational speed control can thereby be both increased and also reduced as a function of the measured additional temperature, whereby the preset closed-loop rotational speed control is influenced in order to adapt the rotational speed behavior of the refrigerant compressor during the cooling cycle such that a most energy-optimized possible operation is enabled. From the measured additional temperature or the progression of the measured additional temperature, the electronic control device of the refrigerant compressor can also deduce that no change in the at least one predefined parameter is indicated. In this operating state, the refrigerant compressor can thus already be operated in the most energy-optimized manner possible as a result of the unmodified preset closed-loop rotational speed control.

The change in the at least one predefined parameter as a function of the measured additional temperature can, for example, take place using an algorithm stored in the control device of the refrigerant compressor. In one embodiment of the method according to the invention, a multiplication factor for the at least one predefined parameter can be provided, for example, wherein the multiplication factor is varied as a function of the measured additional temperature.

It is thus conceivable, for example, that the multiplication factor is increased or decreased continuously or in discrete steps as a function of the measured additional temperature. It is also conceivable that a data set with multiple values for the at least one predefined parameter is stored in the electronic control device, and that a measured additional temperature and/or a temperature range and/or a progression of the measured additional temperature is assigned to each value, wherein the selection of the values for the at least one predefined parameter from the data set takes place based on the currently measured additional temperature.

Normally, the monitoring of the additional temperature and the change to the at least one predefined parameter take place in the electronic control device of the refrigerant compressor. In other words, all parameters and/or algorithms required to change the at least one predefined parameter as a function of the measured additional temperature are saved or stored in the electronic control device.

With the change to the at least one predefined parameter as a function of the measured additional temperature, it can be ensured that the variable-speed refrigerant compressor is operated in the most energy-optimized manner possible. The electricity consumption or energy demand of the refrigerant compressor can thus be further reduced viewed over the service life of the simple refrigeration system.

Analogously, the object stated at the outset can also be attained with an electronic control device for controlling the cyclical operation of a variable-speed refrigerant compressor, wherein the electronic control device is configured
- to switch on the refrigerant compressor as the result of a switching signal triggered by a thermostat for directly or indirectly monitoring a temperature state of a cooling volume of a refrigeration system, in order to begin a cooling cycle; and
- to switch off the refrigerant compressor again as the result of an additional switching signal triggered by the thermostat, in order to end the cooling cycle; and
- to control the rotational speed behavior of the refrigerant compressor during a cooling cycle by means of a preset closed-loop rotational speed control saved in an electronic control device of the refrigerant compressor, based on at least one predefined parameter; and
- to monitor the at least one predefined parameter with regard to an over- and/or undershooting by a current parameter of a current cooling cycle within the scope of the preset closed-loop rotational speed control, In that the electronic control device is connected to a temperature measurement device for measuring an additional temperature independent from the temperature of the cooling volume, and is configured to change the at least one predefined parameter as a function of the additional temperature.

The temperature measurement device can, for example, be embodied as a measuring sensor, a resistance thermometer, a thermocouple, or a temperature sensor.

In a further particularly preferred embodiment of the invention, it is therefore provided that the additional temperature is measured by a temperature measurement device that is an integral component of the electronic control device of the refrigerant compressor.

For other purposes, for example for monitoring the temperature of the electronic control device in order to prevent an overheat, the electronic control device of the refrigerant compressor already typically comprises a temperature measurement device, so that the electronic control devices do not become more expensive because of an implementation of the invention, and so that the measured values of this temperature measurement device can be used as an additional temperature according to the invention.

An additional advantage of the use of the measured values of a temperature measurement device already provided in a conventional electronic control device as an additional measured temperature is that only the programming of the electronic control device of the refrigerant compressor must be changed, not the structure of the electronic control device itself. Refrigerant compressors that are already in use can thus also be easily adapted for performing the method according to the invention.

Likewise, in a second particularly preferred embodiment of the invention, it is provided that the additional temperature is measured by a temperature measurement device, and the temperature measurement device is attached to a housing of the refrigerant compressor. Since the refrigerant compressor and electronic control device of the refrigerant compressor are typically produced as an assembly and supplied to the manufacturer of a refrigeration system, the functionality of the method according to the invention can also be ensured if the temperature measurement device is arranged on the housing of the refrigerant compressor. The temperature measurement device is thus part of the delivered assembly, and the functionality of the method is ensured independent of any installation or connection errors by the manufacturer of the refrigeration system. Particularly preferably, the temperature measurement device is arranged on an external side of the housing, whereas the components of the refrigerant compressor, that is, at least the electric drive unit and the piston/cylinder unit, are arranged in the interior of the housing of the refrigerant compressor.

In both of the particularly preferred embodiments, it can be provided that the measured additional temperature and/or the progression of the measured additional temperature are correlated with the ambient conditions, in particular the ambient temperature, of the refrigeration system using algorithms, preferably mathematical relationships, or empirically determined parameters. Since both the refrigerant compressor and also the electronic control unit of the refrigerant compressor heat up during operation, this operationally induced heating is not taken into consideration in the change to the predefined parameter by the electronic control device, or a deviation of the progression of the measured additional temperature from a predefined progression is used as a control value for the change to the predefined parameter. For example, parameters such as maximum temperature or cooling rate can be empirically determined for the additional temperature for various ambient conditions and can be saved in the form of a reference data set in the electronic control device of the refrigerant compressor; wherein the measured additional temperature is compared with the values of the reference data set or with reference values calculated from the data of the reference data set.

The object stated at the outset is also attained with an assembly comprising variable-speed refrigerant compressor with an electric drive unit and a cylinder/piston unit that can be driven by the electric drive unit for the compression of refrigerant;

an electronic control device according to the invention for controlling the cyclical operation of the variable-speed refrigerant compressor based on a method according to the invention.

An assembly of this type can be easily integrated into a refrigeration system without a control unit of the refrigeration system transmitting a control signal or a preset rotational speed to the electronic control device of the refrigerant compressor.

BRIEF DESCRIPTION OF THE DRAWINGS

The invention will now be explained in greater detail with the aid of an exemplary embodiment. The drawings are by way of example and are intended to demonstrate, but in no way restrict or exclusively describe, the inventive concept.

In this matter:

FIG. 3 shows a schematic illustration of the rotational speed behavior of three different cycles of the refrigerant compressor in a preset closed-loop rotational speed control;

WAYS OF EMBODYING THE INVENTION

Figure 1:
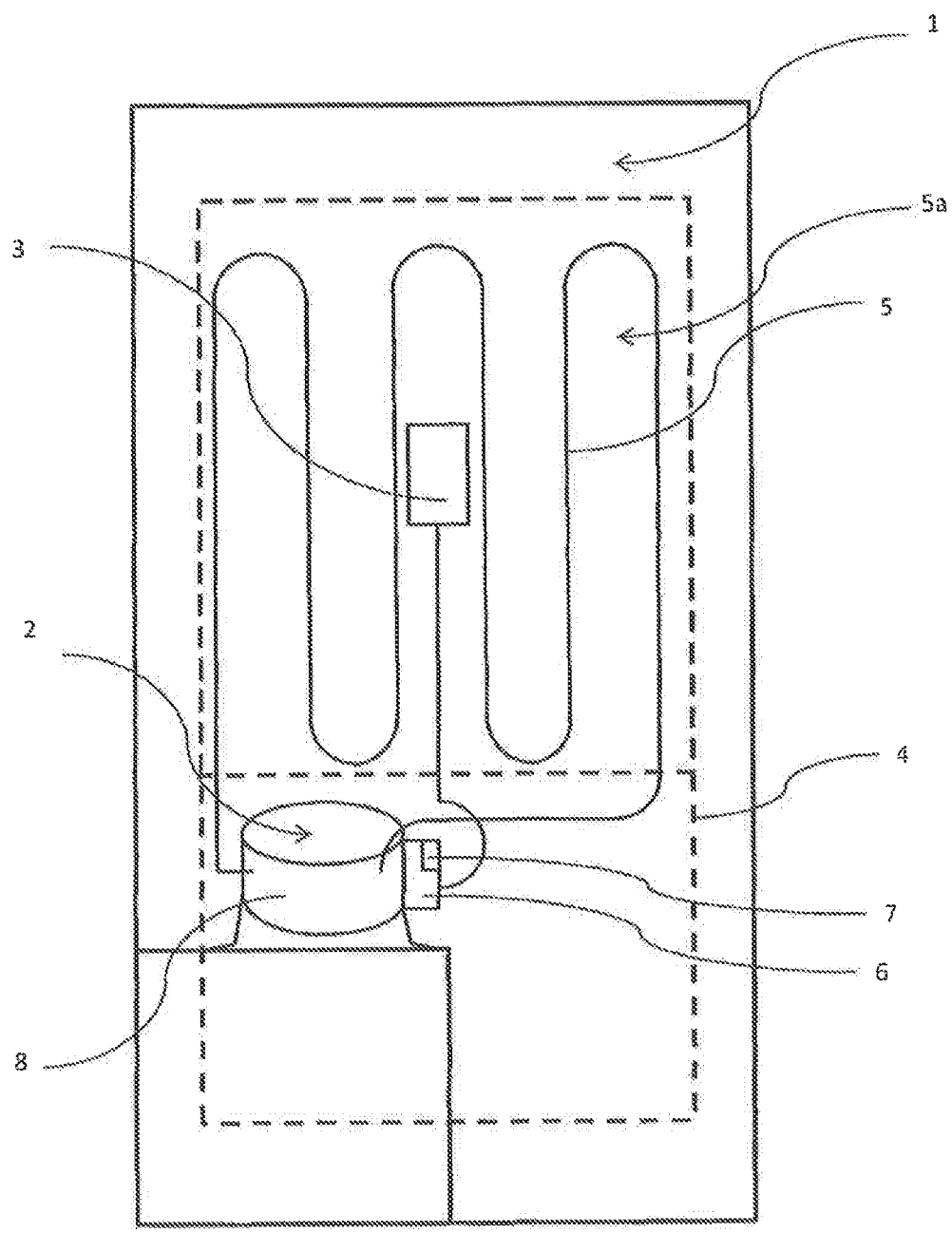
FIG. 1 shows a schematic illustration of a rear side of a refrigeration system with a first embodiment of an electronic control device.

FIG. 1 shows a simple refrigeration system 1 with a variable-speed refrigerant compressor 2, a refrigerant line 5, and an evaporator 5a. The refrigerant compressor 2, refrigerant line 5, and evaporator 5a together form a closed refrigerant system, in which refrigerant system refrigerant circulates during operation, that is, during a cooling cycle $C_K$ of the refrigerant compressor 2. The refrigeration system 1 comprises a cooling volume 4, from which heat can be removed and to which cooling capacity can be supplied by means of the evaporator 5a in that the refrigerant evaporates in the evaporator 5a.

The individual components of the refrigerant compressor 2, that is, at least one piston/cylinder unit in which the refrigerant is compressed in cycles and an electric drive unit via which the piston/cylinder unit can be driven, are arranged inside of a housing 8 of the refrigerant compressor 2. The variable-speed refrigerant compressor 2 furthermore comprises an electronic control device 6 for the control of the rotational speed behavior of the refrigerant compressor 2, which device is connected to the electric drive unit and actuates said unit. To allow the cooling volume 4 to be cooled in the most energy-optimized manner possible, the electronic control device 6 of the variable-speed refrigerant compressor 2 works according to a programmed target during the cooling cycle $C_K$, which target controls the rotational speed behavior of the refrigerant compressor 2 during a cooling cycle $C_K$. This preset closed-loop rotational speed control renders it possible that the variable-speed refrigerant compressor 2 can be operated in the simple refrigeration system 1 and, at the same time, ensures a most energy-efficient possible operation.

The programmed target is thereby already implemented during the programming of the electronic control device 6 of the refrigerant compressor and constitutes, as it were, a standardized delivery state that enables a most energy-efficient possible operation in a plurality of standard use conditions. Typically, the variable-speed refrigerant compressor 2 and the electronic control device 6 are assembled by a refrigerant compressor manufacturer as an assembly and sold as a unit to the manufacturers of refrigeration systems.

The method according to the invention or the electronic control device of the refrigerant compressor according to the invention for adapting the operation of the refrigerant compressor to use conditions which lie outside the standard use conditions, in particular at high ambient temperatures, is described in detail below.

The refrigeration system 1 itself does not comprise a separate control unit that can provide switching signals, parameters, and measured values to the control device 6 of the refrigerant compressor 2 or transmit to it a control signal that contains a preset rotational speed. The only switching signal that the simple refrigeration system 1 transmits to the control device 6 of the refrigerant compressor 2 comes from a thermostat 3, as a function of the temperature level of the cooling volume 4. For this purpose, the thermostat 3 normally comprises a temperature sensor, for example, a bimetallic strip or a vapor pressure-based measuring element or an NTC (negative temperature coefficient) element that is arranged in the cooling volume 4 in order to directly measure the temperature of the cooling volume 4 or on the evaporator 5a in order to indirectly determine the temperature of the cooling volume 4. Preferably, the thermostat 3 is embodied as a vapor pressure-based bellows thermostat. The thermostat 3 is embodied to trigger a switching signal that is transmitted to the control device 6 of the refrigerant compressor 2, or to transmit a switching signal to the control device 6, which switching signal places the refrigerant compressor 2 in an ON state in which the drive unit is activated and refrigerant is compressed in the piston/cylinder unit. The thermostat 3 is embodied to trigger an additional switching signal that is transmitted to the control device 6, or to transmit an additional switching signal to the control device 6, which additional switching signal places the refrigerant compressor 2 in an OFF state in which the piston/cylinder unit is not exposed to a drive torque.

According to the invention, a temperature measurement unit 7 is provided via which an additional temperature $T_W$ independent from the temperature of the cooling volume 4 is measured. In the present embodiment, the temperature measurement unit 7 is embodied as a component of the control device 6, for example, as an onboard sensor on a printed circuit board of the control device 6.

Figure 2:
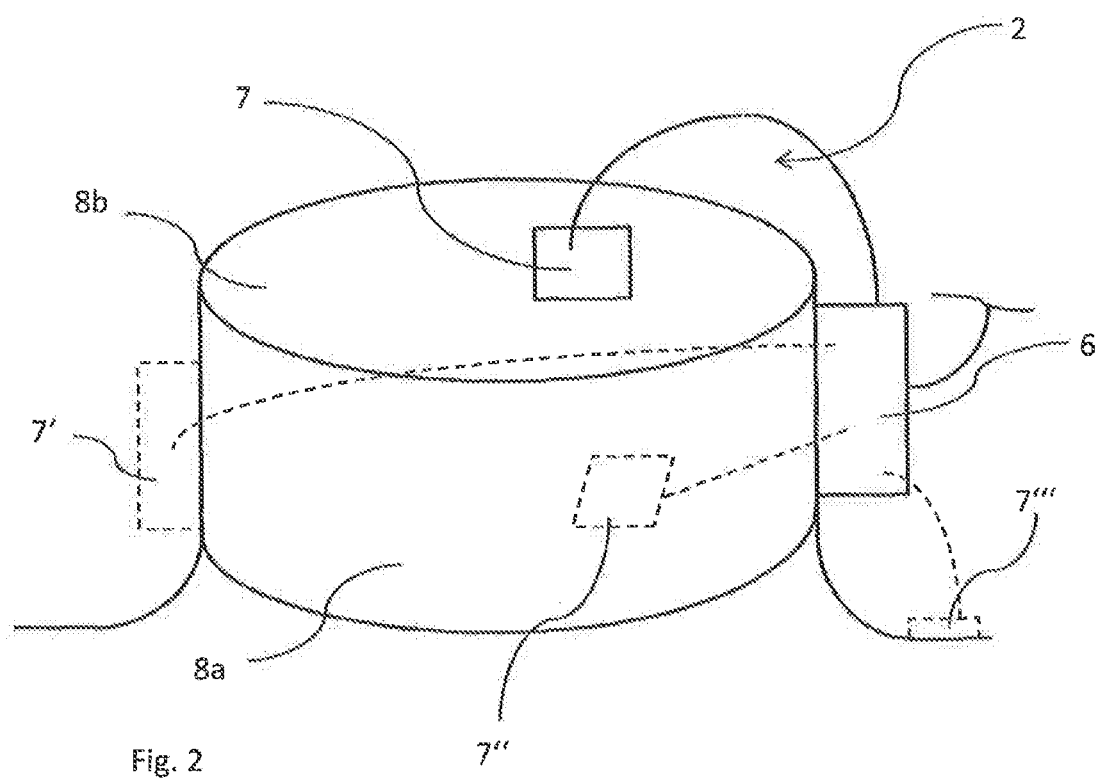
FIG. 2 shows a schematic illustration of a refrigerant compressor with a second embodiment of the electronic control device.

FIG. 2 shows a second embodiment of the invention in which the temperature measurement unit 7 is attached to the housing 8 of the refrigerant compressor 2. The housing 8 of the refrigerant compressor 2 can, for example, be a hermetically encapsulatable housing 8 that comprises a lower housing part 8a and an upper housing part 8b. In the present embodiment, the temperature measurement unit 7 is attached to an outer surface of the upper housing part 8b. The reference numerals 7' and 7" indicate an alternative attachment position illustrated in a dashed manner on an external side of the lower housing part 8a, whereas the reference numeral 7'" indicates an alternative attachment position illustrated in a dashed manner on a stand of the refrigerant compressor 2.

Functional Principle of Invention

A method for operating the variable-speed refrigerant compressor 2 in a simple refrigeration system 1 as already known from the prior art will be described below with the aid of FIG. 3. In particular, the control of the rotational speed behavior of the variable-speed refrigerant compressor 2, referred to as the preset closed-loop rotational speed control, will thereby be explained, in which closed-loop control the rotational speed behavior of the refrigerant compressor 2 during a cooling cycle $C_K$ is controlled based on at least one predefined parameter $K_v$ saved in the electronic control device 6 of the refrigerant compressor 2, and the at least one predefined parameter $K_v$ is monitored with regard to an over- and/or undershooting by a current parameter $K_a$ of a current cooling cycle $C_{Ka}$.

In the present exemplary embodiment, the at least one predefined parameter $K_V$ is the duration of a cooling cycle $C_K$. The current running time and the actual duration of the cooling cycle $C_K$ are thereby monitored by the electronic control device 6.

In FIG. 3, three operating cycles $C_1$, $C_2$, $C_3$ are thereby illustrated by way of example, which operating cycles represent different rotational speed behaviors of the variable-speed refrigerant compressor 2. that can occur during operation. An operating cycle C is thereby respectively composed of a resting cycle $C_R$ and a cooling cycle $C_K$, wherein the refrigerant compressor 2 is in operation during a cooling cycle $C_K$ and refrigerant is circulated in a forced manner through the refrigerant system in order to cool the cooling volume 4. In the resting cycle $C_R$, however, the refrigerant compressor 2 has been switched such that it is not driven, and essentially no cooling of the cooling volume 4 occurs.

The first cooling cycle tags is initiated at time $t_1$ by the switching signal triggered by the thermostat 3, wherein the refrigerant compressor 2 is placed in an ON state by the electronic control device 6. The thermostat 3 triggers the switching signal when a deviation is detected in the temperature level of the cooling volume 4 from a preset temperature level, which allows a cooling demand in the cooling volume 4 to be deduced, so that cooling capacity must be supplied to the cooling volume 4 by the refrigerant compressor 2. In the present case, an overshoot of the preset temperature level is measured by the thermostat 3, or by the temperature sensor of the thermostat 3, at time $t_1$. The temperature in the cooling volume 4 is thus too high.

Once the variable-speed refrigerant compressor 2 has been placed in the ON state, it is operated with a starting rotational speed $v_1$. At time $t_2$, which corresponds to the predefined duration of the cooling cycle $C_{K1}$, the preset temperature level in the cooling volume 4 has not yet been reached, and the thermostat 3 accordingly has not yet triggered a switching signal to place the refrigerant compressor 2 in the OFF state.

A further cooling demand is thus present in the cooling volume 4 at time $t_2$. Since the actual cooling demand of the cooling volume 4 is not known to the electronic control device 6, the rotational speed v is increased by a predetermined value, for example 10%, 20%, 30%, or 50% of the current rotational speed $v_1$, to a first increased rotational speed $v_2$. In this manner, it is ensured that the cooling demand in the cooling volume 4 can be met more quickly, or at all in the case of a very high cooling demand, and/or that the cooling cycle can be ended quickly.

At time $t_3$, which corresponds to a limit value of a data set stored in the predefined running time $K_v$, the cooling demand of the cooling volume 4 still has not been met yet, so that in the present example, an additional increase in the rotational speed v to a second increased rotational speed $v_3$ occurs for the aforementioned reasons.

At time $t_4$, the electronic control device 6 receives the additional switching signal triggered by the thermostat 3, which signals that the cooling demand in the cooling volume 4 has been. met and the temperature within the cooling volume 4 is within the predefined temperature level required for the cooling. As a result of the additional switching signal, the electronic control device 6 places the refrigerant compressor 2 in the OFF, state, whereby the second resting cycle $C_{R2}$ is initiated. The time elapsed between time $t_1$ and $t_4$ corresponds to the actual duration $K_1$ of the first cooling cycle $C_{K1}$. Since the actual duration $K_1$ is greater than the predefined duration $K_V$, it can either be provided that the next cooling cycle $C_{K2}$ is started with no change according to the preset closed-loop rotational speed control, with the risk that a readjustment must be made, as in $C_{K1}$, or else it can be provided that the electronic control device 6 assumes an increased cooling demand in the subsequent cooling cycle $C_{K2}$. The latter can in particular be the case where cooling cycles for which the duration was longer than the predefined running time $K_v$ already exist before the cooling cycle $C_{K1}$.

To take the anticipated higher cooling demand of the cooling volume 4 into account, and to be able to supply this cooling demand within the predefined duration $K_V$ of the subsequent cooling cycle $C_{K2}$, the subsequent cooling cycle $C_{K2}$, which is once again initiated by the switching signal, is operated with an increased starting rotational speed $v_4$. The increased starting rotational speed $v_4$ can, for example, correspond to the final rotational speed v of the preceding cooling cycle $C_{K1}$ or can be calculated as the average of the rotational speeds $v_1$, $v_2$, $v_3$ of the preceding cooling cycle $C_{K1}$.

In the second cooling cycle $C_{K2}$, the electronic control device 6 receives the additional switching signal triggered by the thermostat 3 for switching off the refrigerant compressor 2 at time $t_6$. The actual duration $K_2$ of the second cooling cycle $C_{K2}$ is, however, less than the predefined duration $K_V$, so that the actual cooling demand of the cooling volume 4 has already been met before the predefined duration $K_V$ is reached at time $t_7$. From this, the electronic control device 6 can deduce that a lower cooling demand is necessary in the subsequent cooling cycle $C_{K3}$.

To take the anticipated lower cooling demand of the cooling volume 4 into account, and to achieve this cooling demand within the predefined duration $K_V$ of the subsequent cooling cycle $C_{K3}$, the third cooling cycle $C_{K3}$ is started at a rotational speed v that is reduced compared to the rotational speed $v_4$ of the preceding cooling cycle $C_{K2}$ and which in the present exemplary embodiment corresponds to the starting rotational speed $v_1$. In the third cooling cycle $C_{K3}$, the predefined duration $K_V$ is identical to the duration $K_3$ of the third cooling cycle $C_3$, so that the cooling demand of the cooling volume 4 is reached within the predefined duration $K_V$ at the rotational speed $v_1$. In the third cooling cycle $C_{K3}$, a particularly energy-saving operation of the refrigeration compressor 2 is achieved.

The control described above for the rotational speed behavior of the refrigerant compressor 2 in the electronic control device 6 corresponds to the preset closed-loop rotational speed control that is designed to enable a most energy-optimized possible operation throughout the entire operating time of the refrigerant compressor 2.

However, a disadvantage of the prior art manifests itself in that the predefined parameter $K_V$, that is, the predefined duration $K_V$ of the cooling cycle $C_K$ in the present exemplary embodiment, must already be saved in the electronic control device 6 during the design of the electronic control device 6 of the refrigerant compressor 2. Since refrigerant compressors 2 for simple refrigeration systems 1 are sold all around the world, no information at all is available about the use conditions of the refrigeration system 1 during operation, in particular with regard to the place of use of the refrigeration system 1, when the electronic control device 6 is being programmed.

The place of use and, in conjunction therewith, the ambient temperature nevertheless have a decisive influence on the setting of the predefined parameter $K_V$, since for example a high ambient temperature $T_U$ causes greater cooling losses during operation of the refrigeration system 1 and a most energy-optimized possible operation at higher ambient temperatures $T_U$ requires a different predefined parameter than in the case of lower ambient temperatures $T_U$.

In that respect, the factory design of the predefined parameter $K_V$ can therefore only constitute a compromise.

Figure 4A:
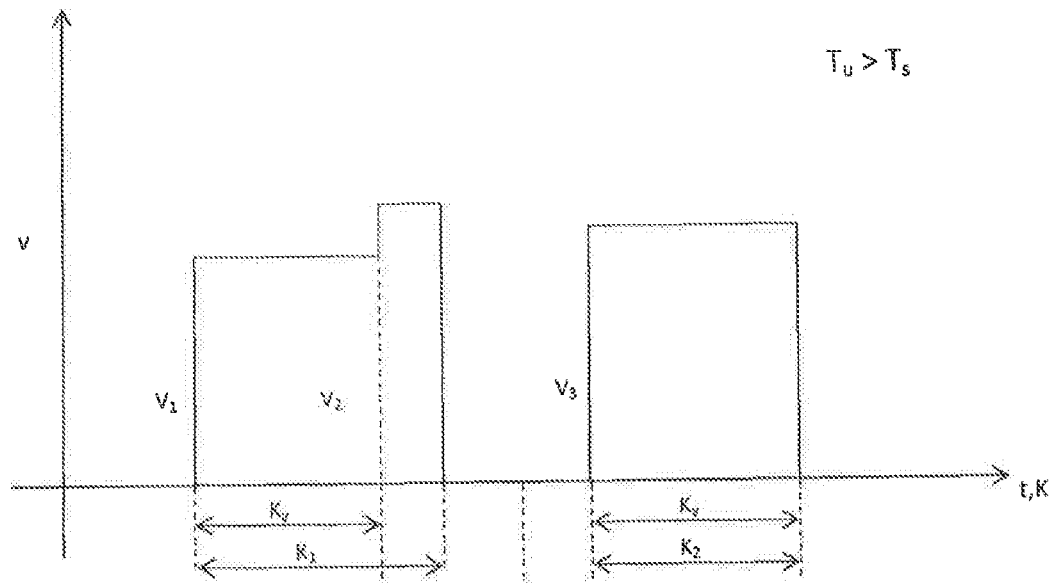
FIGS. 4a, 4b show a comparison of the rotational speed behavior of a refrigerant compressor with an operating behavior according to the prior art (4a) and with an operating behavior according to the invention (4b).

FIG. 4a illustrates the influence of the use conditions on the preset closed-Loop rotational speed control in the prior art. In the exemplary embodiment illustrated therein, the actual ambient temperature $T_U$ during operation of the refrigerant compressor is above the ambient temperature $T_U$ included in the standard conditions for the design of the predefined duration. $K_V$ of the cooling cycle $C_K$.

As is illustrated in the first cooling cycle $C_{K1}$ in FIG. 4a, the actual duration $K_1$ of the first cooling cycle $C_{K1}$ exceeds the predefined duration $K_V$, which causes an increase in the rotational speed to a first increased rotational speed $v_2 >$ starting rotational speed $v_1$, after the predefined duration $K_v$ is reached. However, in this case, the increased cooling demand does not result from an increased cooling demand of the cooling volume 4, but rather from the higher cooling losses in the refrigerant system resulting due to the increased ambient temperature $T_U$.

The subsequent cooling cycle $C_{K2}$ is thereupon started with an additional increased rotational speed $v_3$, wherein in the present example the actual duration $K_2$ of the second cooling cycle $C_{K2}$ is essentially identical to the predefined duration $K_V$ as a result of the operation of the refrigerant compressor 2 with the additional increased rotational speed $v_3$ in the subsequent cooling cycle $C_{K2}$, and no change to the rotational speed v is therefore necessary.

Throughout the operating time of the refrigeration system 1, the refrigerant compressor 2 therefore must, as a result of the influence of the ambient conditions, be operated on average with a higher rotational speed v than is actually provided on the basis of a most energy-optimized possible operation and/or than was provided at the time of the factory programming of the electronic control.

Figure 4B:
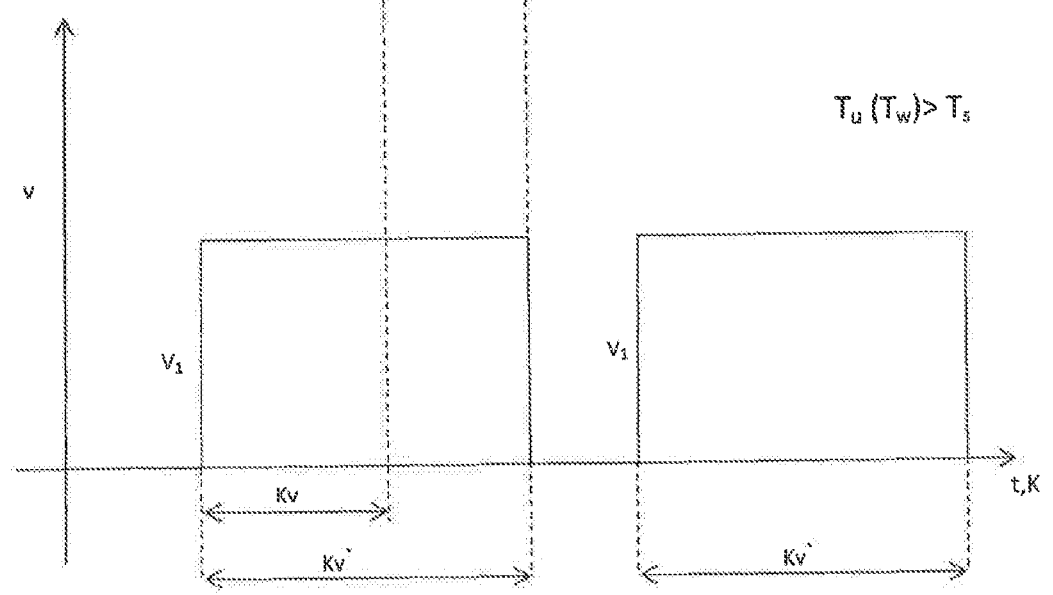

According to the invention, an additional temperature $T_W$ that is independent from the cooling volume 4 is therefore measured, and the predefined parameter $K_V$, that is, the predefined duration $K_V$ of the cooling cycle $C_K$ in the present exemplary embodiment as a basis for the preset closed-loop rotational speed control, is changed as a function of the additional temperature $T_W$. Using the additional temperature $T_W$ or the progression of the additional temperature $T_W$, it is possible to draw conclusions about the use conditions in the electronic control device 6, and the predefined parameter $K_V$ can thus be adapted to the use conditions actually prevailing, in particular the prevailing ambient temperature $T_U$, as can be seen in FIG. 4b. In principle, the additional temperature $T_W$ can be measured at any point of the refrigeration system 1—except for the cooling volume 4—or even outside of the refrigeration system 1. However, it has proven advantageous that the additional temperature $T_W$ is measured by the temperature measurement device 7, which, as illustrated in the exemplary embodiments in FIGS. 1 and 2, is either a component of the electronic control device 6 of the refrigerant compressor 2 or is attached to the housing 8 of the refrigerant compressor 2. Since the refrigerant compressor 2 and electronic control device 6 of the refrigerant compressor 2 are normally supplied to the manufacturers of refrigeration systems 1 as an assembly, it can thus be ensured that the additional temperature $T_W$ necessary for the change to the predefined parameter $K_V$ according to the invention is provided.

FIG. 4b then illustrates the effect of the change to the predefined duration $K_V$. This duration is modified according to the invention to a modified predefined duration $K_V^*$ based on the additional temperature $T_W$, which modified duration replaces the predefined duration $K_v$ saved in the electronic control device 6 of the refrigerant compressor 2 during production. The modification of the predefined duration $K_V$ is performed by the electronic control device 6, since the measured additional temperature $T_W$ indicates an increased ambient temperature $T_U$.

As the comparison of FIGS. 4a and 4b shows, the modified predefined duration $K_V^*$ is longer than the predefined duration $K_V$, so that no increase in the rotational speed v is necessary during the cooling cycles $C_K$. The refrigerant compressor 2 can thus be operated relatively consistently with the starting rotational speed $v_1$. Even though the refrigerant compressor 2 is driven for longer because of the longer modified predefined duration $K_V^*$, the energy consumption is still lower than in the control according to FIG. 4a as a result of the lower rotational speed v. Because of the change to or modification of the predefined duration $K_V$ according to the invention, it is thus possible to enable an operation that is matched to the use conditions for the refrigeration system 1 and is as energy-optimized as possible. Analogously to the preset closed-loop rotational speed control depicted in FIG. 3, all of the processes depicted therein can, of course, also be carried out with the modified predefined duration $K_V^*$ instead of the predefined duration $K_V$ saved in the electronic control device 6 during production and shown therein, with the result that an increase in the rotational speed only occurs if this modified predefined duration $K_V^*$ also does not lead to a switching-off signal from the thermostat 3.

If the ambient temperature $T_U$ determined based on the measured additional temperature $T_W$ should rise further, a renewed modification of the modified predefined duration $K_V^*$, for instance, an additional increase of the modified duration $K_V^*$ of the cooling cycle $C_K$, may be necessary. However, if a value or a temperature progression of the additional temperature $T_W$ is detected that allows a decrease in the ambient temperature $T_U$ to be deduced, the modified predefined duration $K_V^*$ of the cooling cycle $C_K$ can be lowered or reset to the predefined duration $K_V$. Of course, it is equally conceivable that the modified predefined duration $K_V^*$ can be reduced compared to the predefined duration $K_V$ if the ambient temperature $T_U$ lies below the temperature level set for the ambient temperature $T_U$ in the standard conditions.

LIST OF REFERENCE NUMERALS

1 Refrigeration system
2 Refrigerant compressor

3 Thermostat
4 Cooling volume
5 Refrigerant
  5a Evaporator
6 Electronic control device of the refrigerant compressor 2
7 Temperature measurement device
8 Housing of the refrigerant compressor 2
  8a Lower housing part
  8b Upper housing part
$K_v$ Predefined parameter
$K_v^*$ Modified predefined parameter
$K_a$ Current parameter
v Rotational speed
$C_R$ testing cycle
$C_K$ Cooling cycle
C Operating cycle
$T_w$ Additional temperature
$T_U$ Ambient temperature
$T_s$ Standard temperature

The invention claimed is:

1. A method for operating a variable-speed refrigerant compressor for cooling a cooling volume of a refrigeration system, wherein the refrigeration system includes at least one thermostat for directly or indirectly monitoring a temperature state of the cooling volume, the method comprising:
cyclically operating the refrigerant compressor, wherein a cooling cycle of the refrigerant compressor begins when the refrigerant compressor is placed in an ON state by a switching signal triggered by the thermostat and the cooling cycle ends when the refrigerant compressor is placed in an OFF state by an additional switching signal triggered by the thermostat, and
controlling a rotational speed behavior of the refrigerant compressor during the cooling cycle by a preset closed-loop rotational speed control saved in an electronic control device of the refrigerant compressor, based on at least one predefined parameter, in that the at least one predefined parameter is monitored with respect to an over- and/or undershooting by a current parameter of a current cooling cycle,
wherein an additional temperature independent from the temperature of the cooling volume is measured and the at least one predefined parameter is changed as a function of the additional temperature.

2. The method according to claim 1, wherein the at least one predefined parameter is the duration of a cooling cycle.

3. The method according to claim 1, wherein the additional temperature is measured by one of a measuring sensor, a resistance thermometer, a thermocouple or a temperature sensor and the one of the measuring sensor, the resistance thermometer, the thermocouple or the temperature sensor is a component of the electronic control device of the refrigerant compressor.

4. The method according to claim 1, wherein the additional temperature is measured by one of a measuring sensor, a resistance thermometer, a thermocouple or a temperature sensor and the one of the measuring sensor, the resistance thermometer, the thermocouple or the temperature sensor is attached to a housing of the refrigerant compressor.

5. An electronic control device for controlling cyclical operation of a variable-speed refrigerant compressor, the electronic control device being configured
to switch on the refrigerant compressor as the result of a switching signal triggered by a thermostat for directly or indirectly monitoring a temperature state of a cooling volume of a refrigeration system, in order to begin a cooling cycle; and
to switch off the refrigerant compressor again as the result of an additional switching signal triggered by the thermostat, in order to end the cooling cycle; and
to control the rotational speed behavior of the refrigerant compressor during a cooling cycle by means of a preset closed-loop rotational speed control saved in an electronic control device of the refrigerant compressor, based on at least one predefined parameter; and
to monitor the at least one predefined parameter with regard to an over- and/or undershooting by a current parameter of a current cooling cycle within the scope of the preset closed-loop rotational speed control;
wherein the electronic control device is connected to one of a measuring sensor, a resistance thermomemter, a thermocouple or a temperature sensor for measuring an additional temperature independent from the temperature of the cooling volume and is configured to change the at least one predefined parameter as a function of the additional temperature.

6. The electronic control device according to claim 5, wherein the at least one predefined parameter is the duration of a cooling cycle.

7. The electronic control device according to claim 5, wherein the one of the measuring sensor, the resistance thermometer, the thermocouple or the temperature sensor is a component of the electronic control device of the refrigerant compressor.

8. The electronic control device according to claim 5, wherein the one of the measuring sensor, the resistance thermometer, the thermocouple or the temperature sensor is arranged on a housing of the refrigerant compressor.

9. An assembly comprising
a variable-speed refrigerant compressor with an electric drive unit and a cylinder/piston unit that can be driven by the electric drive unit for the compression of refrigerant;
an electronic control device according to claim 5 or controlling the cyclical operation of the variable-speed refrigerant compressor by cyclically operating the refrigerant compressor, beginning a cooling cycle of the refrigerant compressor when the refrigerant compressor is placed in an ON state by a switching signal triggered by the thermostat, ending the cooling cycle when the refrigerant compressor is placed in an OFF state by an additional switching signal triggered by the thermostat, and controlling a rotational speed behavior of the refrigerant compressor during the cooling cycle by a preset closed-loop rotational speed control saved in an electronic control device of the refrigerant compressor, based on at least one predefined parameter, in that the at least one predefined parameter is monitored with respect to an over- and/or undershooting by a current parameter of a current cooling cycle, wherein an additional temperature independent from the temperature of the cooling volume is measured and the at least one predefined parameter is changed as a function of the additional temperature.

* * * * *